US009985869B2

(12) United States Patent
Anantharam et al.

(10) Patent No.: US 9,985,869 B2
(45) Date of Patent: May 29, 2018

(54) SUPPORT FOR HIGH AVAILABILITY OF SERVICE APPLIANCES IN A SOFTWARE-DEFINED NETWORK (SDN) SERVICE CHAINING INFRASTRUCTURE

(71) Applicant: International Business Machines Corporation, Armonk, NY (US)

(72) Inventors: Sushma Anantharam, Cupertino, CA (US); Amitabha Biswas, San Francisco, CA (US); Nirapada Ghosh, Sunnyvale, CA (US); Ryan D. Moats, III, Omaha, NE (US); Uday Shankar Nagaraj, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 14/735,109

(22) Filed: Jun. 9, 2015

(65) Prior Publication Data

US 2016/0366046 A1  Dec. 15, 2016

(51) Int. Cl.
*G06F 15/16* (2006.01)
*H04L 12/751* (2013.01)

(52) U.S. Cl.
CPC .................. *H04L 45/026* (2013.01)

(58) Field of Classification Search
CPC .................................................... H04L 45/026
USPC .................................................. 709/217, 203
See application file for complete search history.

(56) References Cited

U.S. PATENT DOCUMENTS 8,085,662 B2   12/2011  Hiscock
8,281,302 B2   10/2012  Durazzo et al.
8,370,528 B2    2/2013  Bryers et al.
8,953,599 B1 *  2/2015  Barth ...................... H04L 45/02
                                                                 370/390
9,602,308 B2    3/2017  Benny et al.
2002/0018448 A1  2/2002  Amis et al.
2006/0039371 A1  2/2006  Castro et al.
2006/0245350 A1* 11/2006  Shei ........................ H04L 45/22
                                                                 370/216
2012/0246282 A1  9/2012  Oguchi
2013/0074066 A1  3/2013  Sanzgiri et al.
2013/0107709 A1  5/2013  Campbell et al.
(Continued)

FOREIGN PATENT DOCUMENTS

WO   2004082185 A2   9/2004

OTHER PUBLICATIONS

List of IBM Patents or Patent Applications Treated As Related.
(Continued)

*Primary Examiner* — Duyen Doan

(74) *Attorney, Agent, or Firm* — Zilka-Kotab, P.C.

(57) ABSTRACT

In one embodiment, a controller includes a processor and logic integrated with and/or executable by the processor, the logic being configured to receive a query from a network device for instruction regarding where to send network traffic, the query including a first cookie, determine whether the first cookie is legitimate, and send a message to the network device, the message including either: the first cookie in response to a determination that the first cookie is legitimate or a second cookie which indicates a second next hop device determined by the controller in response to a determination that the first cookie is not legitimate. Other systems, methods, and computer program products are described in more embodiments.

18 Claims, 12 Drawing Sheets

(56) References Cited

U.S. PATENT DOCUMENTS

| | | | |
|---|---|---|---|
| 2013/0155902 A1 | 6/2013 | Feng et al. | |
| 2013/0223449 A1 | 8/2013 | Koganti et al. | |
| 2013/0305085 A1 | 11/2013 | Ocko et al. | |
| 2013/0311663 A1 | 11/2013 | Kamath et al. | |
| 2014/0101656 A1 | 4/2014 | Zhu et al. | |
| 2014/0269705 A1* | 9/2014 | DeCusatis | H04L 45/52 370/390 |
| 2015/0372840 A1* | 12/2015 | Benny | H04L 12/4675 370/409 |
| 2017/0126435 A1 | 5/2017 | Benny et al. | |

OTHER PUBLICATIONS

Non-Final Office Action from U.S. Appl. No. 14/312,522, dated Jun. 7, 2016.

Notice of Allowance from U.S. Appl. No. 14/312,522, dated Nov. 3, 2016.

Benny et al., U.S. Appl. No. 15/400,824, filed Jan. 6, 2017.

Non-Final Office Action from U.S. Appl. No. 15/400,824, dated Jul. 13, 2017.

Corrected Notice of Allowance from U.S. Appl. No. 14/312,522, dated Feb. 14, 2017.

Anonymous, "Method and System for Reducing Latency of Flows in a Software Defined Network (SDN) Service Appliance Chain," IP.com Prior Art Database Technical Disclosure, Jan. 6, 2015 (Grace Period Article by Another).

Cisco, "Enabling Service Chaining on Cisco Nexus 1000V Series," Cisco and/or its affilates, Jun. 2013, pp. 1-25.

Salvestrini et al., "Towards a distributed SDN control: Inter-platform signaling among flow processing platforms," Future Networks and Services, 2013, pp. 1-7.

Benny et al., U.S. Appl. No. 14/312,522, filed Jun. 23, 2014.

Final Office Action from U.S. Appl. No. 15/400,824, dated Nov. 3, 2017.

Advisory Action from U.S. Appl. No. 15/400,824, dated Feb. 5, 2018.

* cited by examiner

SUPPORT FOR HIGH AVAILABILITY OF SERVICE APPLIANCES IN A SOFTWARE-DEFINED NETWORK (SDN) SERVICE CHAINING INFRASTRUCTURE

BACKGROUND

The present invention relates to service appliances used in virtual networks, and more particularly, this invention relates to supporting high availability of service appliances used for service chaining in software-defined networks (SDNs).

Network virtualization is implemented by many vendors using overlay technologies, such as Virtual Extensible Local Area Network (VXLAN), Network Virtualization using Generic Routing Encapsulation (NVGRE), etc., to form tunnels, where an identifier is used to indicate a virtual network for each tunneled packet. These technologies enable multiple virtual networks to be utilized over the same physical network. Usually, a virtual switch component in a host or a virtualization layer (e.g., a hypervisor) provides the virtual ports which may be used to associate virtual machines (VMs) to the various virtual networks.

Even though communication within a virtual network is a given, it is possible to allow or control communication across virtual networks. In physical networks, it is possible to use service appliances, such as those which implement firewalls, transcoding, load balancing, etc. Normally, the service appliances are inserted as a "bump in the wire" between the networks and/or services. These kind of service appliances (e.g., "waypoints") are not currently supported in virtual networks. However, since network virtualization abstracts physical Layer-2/Layer-3 networks, the use of physical appliances in a virtual network becomes a serious challenge. A bump in the wire insertion of one or more service appliances is not possible in virtual networks, as multiple virtual networks may share the same physical infrastructure and service appliances may not be able to distinguish between packets belonging to one specific virtual network from all the others.

There are some mechanisms available to allow for the insertion of service appliances in overlay networks defined by a SDN. Once the service appliances are inserted into the overlay network, the management and control plane configure the data forwarding layers so that data frames in the overlay network follow the path defined by the overlay network administrator, e.g., the SDN controller. However, there is currently no solution which allows for a service appliance to be inserted into an overlay network without requiring the service appliance to engage in some control plane activity with other components.

Furthermore, these service appliances may be needed to operate in a high availability mode where multiple service appliances provide the same functionality or service and the SDN administrator is allowed to choose how data flows through the set of similar service appliances. Typical high availability modes that may be employed in other applications include active/active or active/standby designations for devices performing the same functionality. However, there is currently no known method which allows for such configurations in service appliances used in service chaining.

SUMMARY

In one embodiment, a controller includes a processor and logic integrated with and/or executable by the processor. The logic is configured to receive a query from a network device for instruction regarding where to send network traffic. The query includes a first cookie. The logic is also configured to determine whether the first cookie is legitimate. Moreover, the logic is configured to send a message to the network device. The message includes either: the first cookie in response to a determination that the first cookie is legitimate or a second cookie which identifies a second next hop device determined by the controller in response to a determination that the first cookie is not legitimate.

In another embodiment, a network device includes a processor and logic integrated with and/or executable by the processor. The logic is configured to receive network traffic from an upstream device. The logic is also configured to send a query to a controller for instruction regarding where to send the network traffic. The query includes a first cookie. Moreover, the logic is configured to receive a message from the controller. The message includes either: the first cookie indicating that the first cookie is legitimate and that the network traffic is to be sent to a first next hop device associated with the first cookie or a second cookie indicating that the first cookie is not legitimate and that the network traffic is to be sent to a second next hop device identified by the second cookie. The logic is also configured to send the network traffic to the first next hop device in response to the message including the first cookie. Additionally, the logic is configured to store the second cookie to a forwarding cache and send the network traffic to the second hop device in response to the message including the second cookie.

In yet another embodiment, a computer program product includes a computer readable storage medium having program instructions embodied therewith. The embodied program instructions are executable by a processor to cause the processor to perform a method. The method includes receiving network traffic, using a network device, from an upstream device. The method also includes sending a query from the network device to a controller for instruction regarding where to send network traffic. The query includes a first cookie. Moreover, the method includes determining, using the controller, whether the first cookie is legitimate. Additionally, the method includes sending, using the controller, a message to the network device. The message includes either: the first cookie which includes a first next hop device in response to a determination that the first cookie is legitimate or a second cookie which identifies a second next hop device determined by the controller in response to a determination that the first cookie is not legitimate. The method also includes sending the network traffic to the first next hop device identified by the first cookie in response to the message including the first cookie. Moreover, the method includes storing the second cookie to a forwarding cache of the network device and sending the network traffic to the second hop device in response to the message including the second cookie.

Other aspects and embodiments of the present invention will become apparent from the following detailed description, which, when taken in conjunction with the drawings, illustrate by way of example the principles of the invention.

DETAILED DESCRIPTION

Figure 1:
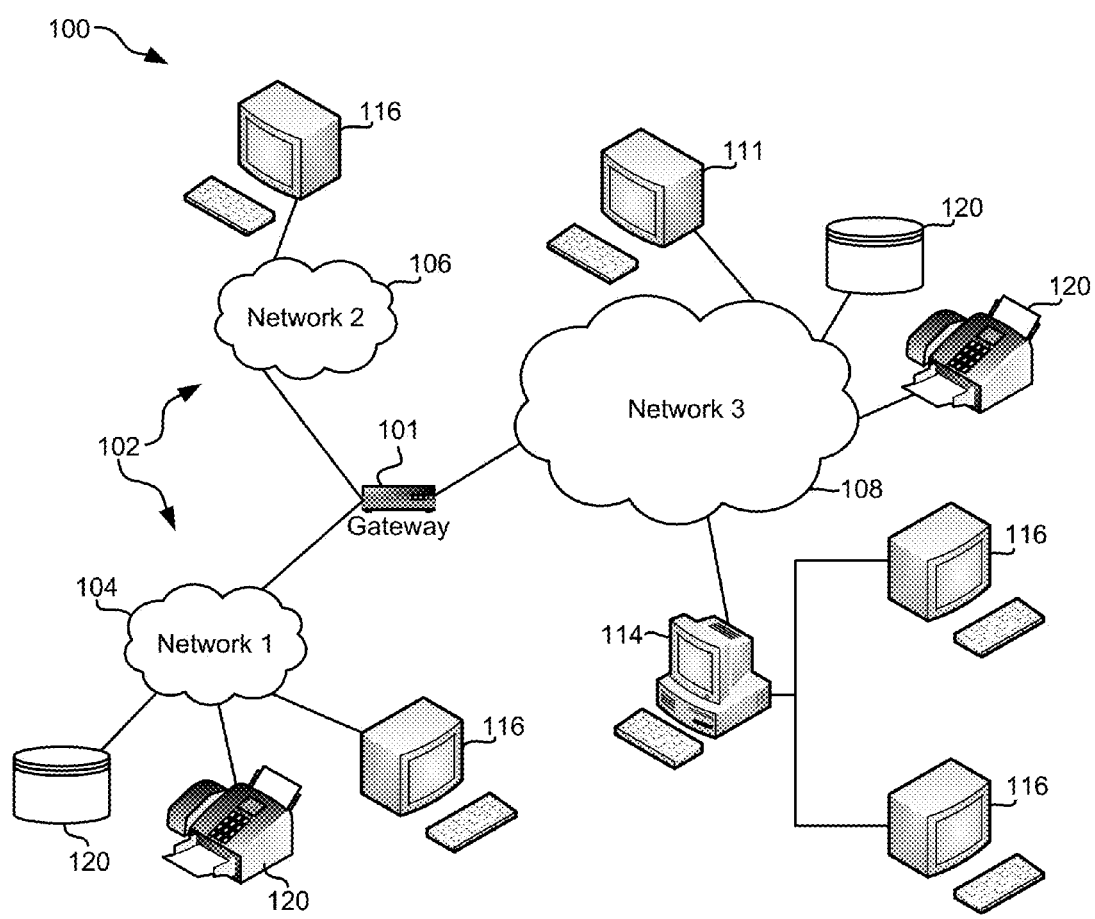
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one approach, once a service appliance configuration is pushed to the control plane, one or more devices in the service chain query the control plane regarding where to direct a particular data frame (such as an overlay-encapsulated packet) each time, along with a cookie (default or from a previous query). The control plane, which has full knowledge of the topology and the configuration of the overlay network, returns the next hop for the frame (which could be a service appliance) along with a cookie that identifies the next hop. At each point/hop of the data frame's path to the final destination, this decision is taken with the help of the control plane. Some of the control plane messages and computations which are used to perform these tasks are disclosed herein according to various embodiments. Since there could be a variety of overlay flows in a deployment, the control plane entity is configured to optimize search algorithms to return the next hop of a data frame quickly. A variety of tables may be used to achieve the desired speed for a query from a virtual switch.

Additionally, in one embodiment, the control plane is configured to bind a flow to a single service appliance which is originally selected for that particular flow using the cookie. In other words, when a flow is being directed to a first appliance, the flow will continue to be directed to that service appliance even when there are other service appliances added and/or deleted from a set of all similar service appliances. Therefore, a new query on the original flow will always return the first service appliance as the next hop when the first service appliance is available for processing traffic.

In one general embodiment, a controller includes a processor and logic integrated with and/or executable by the processor. The logic is configured to receive a query from a network device for instruction regarding where to send network traffic. The query includes a first cookie. The logic is also configured to determine whether the first cookie is legitimate. Moreover, the logic is configured to send a message to the network device. The message includes either: the first cookie in response to a determination that the first cookie is legitimate or a second cookie which identifies a second next hop device determined by the controller in response to a determination that the first cookie is not legitimate.

In another general embodiment, a network device includes a processor and logic integrated with and/or executable by the processor. The logic is configured to receive network traffic from an upstream device. The logic is also configured to send a query to a controller for instruction regarding where to send the network traffic. The query includes a first cookie. Moreover, the logic is configured to receive a message from the controller. The message includes either: the first cookie indicating that the first cookie is legitimate and that the network traffic is to be sent to a first next hop device associated with the first cookie or a second cookie indicating that the first cookie is not legitimate and that the network traffic is to be sent to a second next hop device identified by the second cookie. The logic is also configured to send the network traffic to the first next hop device in response to the message including the first cookie. Additionally, the logic is configured to store the second cookie to a forwarding cache and send the network traffic to the second hop device in response to the message including the second cookie.

In yet another general embodiment, a computer program product includes a computer readable storage medium having program instructions embodied therewith. The embodied program instructions are executable by a processor to cause the processor to perform a method. The method includes receiving network traffic, using a network device, from an upstream device. The method also includes sending a query from the network device to a controller for instruction regarding where to send network traffic. The query includes a first cookie. Moreover, the method includes determining, using the controller, whether the first cookie is legitimate. Additionally, the method includes sending, using the controller, a message to the network device. The message includes either: the first cookie which includes a first next hop device in response to a determination that the first cookie is legitimate or a second cookie which identifies a second next hop device determined by the controller in response to a determination that the first cookie is not legitimate. The method also includes sending the network traffic to the first next hop device identified by the first cookie in response to the message including the first cookie. Moreover, the method includes storing the second cookie to a forwarding cache of the network device and sending the network traffic to the second hop device in response to the message including the second cookie.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
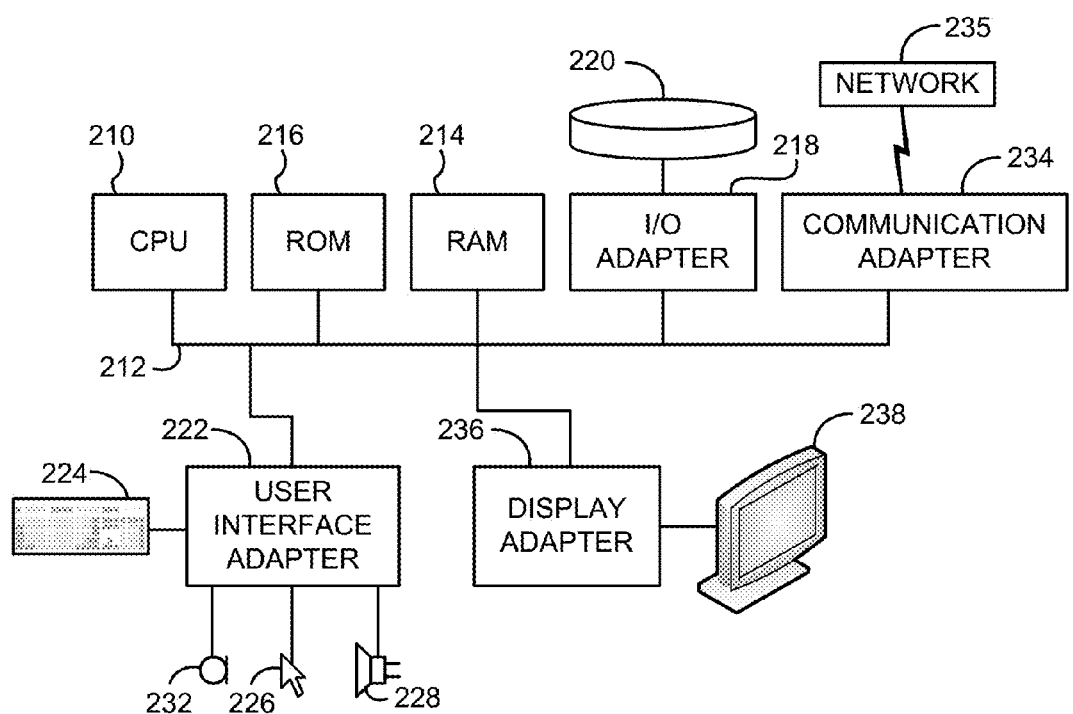
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
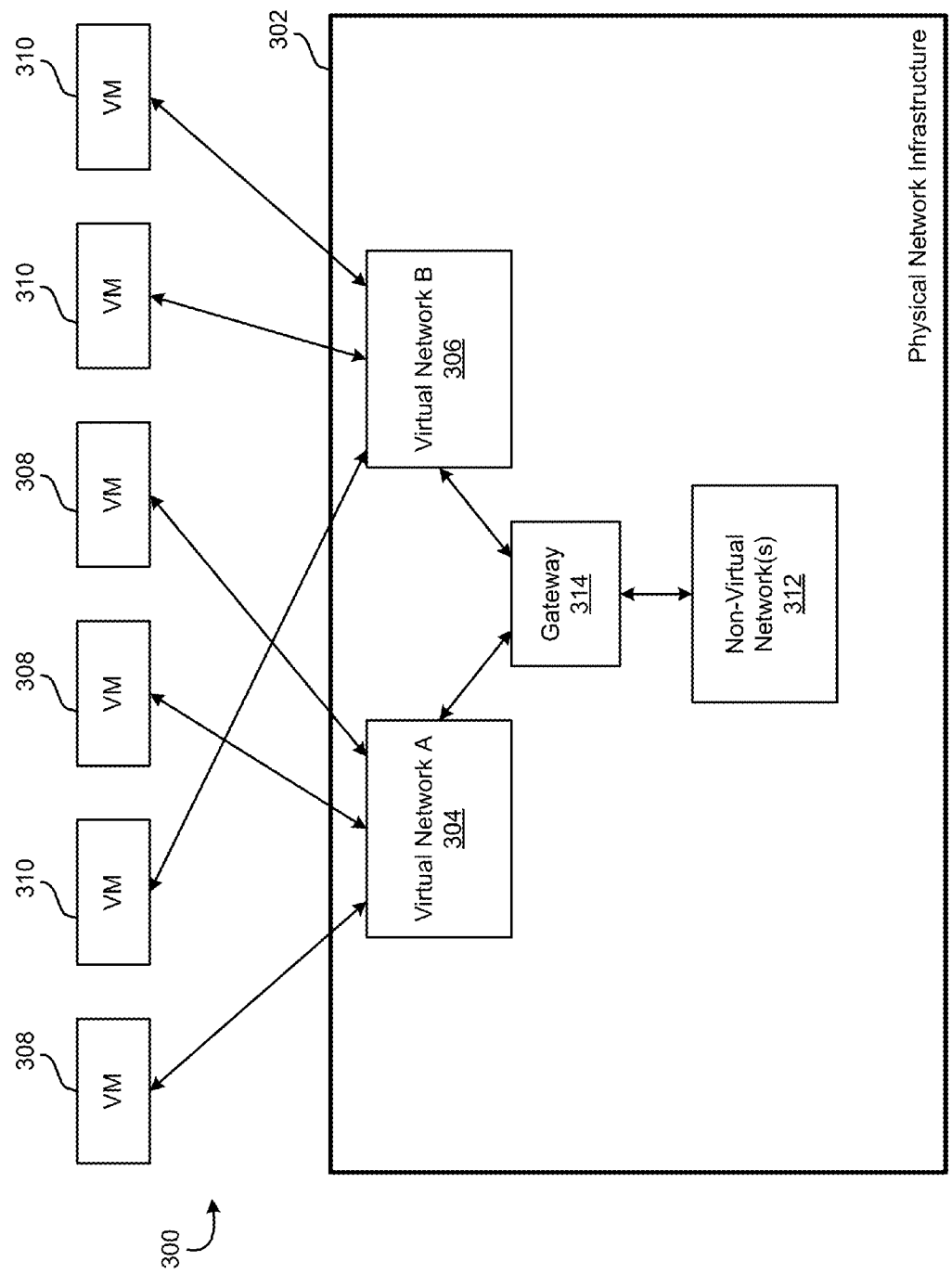
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

A virtual network may be identified by a tunnel endpoint identifier, referred to as a Virtual Network ID (VNID). In one embodiment, there may be multiple different types or categories of VNIDs. In one such embodiment, an Endpoint VNID (EPVNID) may be used to denote source and/or destination devices, such as hosts, VMs, etc. There are no restrictions on the number of devices that may exist in any single EPVNID, and of course, there may be many unique EPVNIDs that exist in a physical network infrastructure. According to another embodiment, a Waypoint VNID (WPVNID) may be used to denote a single waypoint device ("bump in the wire," such as a VM, appliance, etc.) that is positioned between other devices in a path through the physical infrastructure. Each waypoint device is assigned a unique WPVNID so that it may be uniquely described in a path definition through the network.

According to one embodiment, waypoint policies may be used to define the way that traffic should flow between a source device and a destination device (source and destination endpoints). These policies may be created for each port on a distributed virtual switch, or just for some of the ports as determined by the administrator. Each waypoint policy may be applied based on any factor or combination of factors, such as on the basis of a source destination media access control (MAC) address, a destination MAC address, a protocol, a Layer-4 (L4) port, an inter-virtual network, etc. Each policy may identify a unique WPVNID and may be made available to all the virtual switches, such as via a software-defined network (SDN) controller or some other device that is in communication with all the virtual switches in the overlay network and/or SDN.

Table 1 shows an exemplary port identifier (Port ID)-based waypoint policy that may be implemented in a virtual network according to one embodiment.

TABLE 1

| Port ID | Waypoint Policy | Waypoint ID (WPVNID) |
|---|---|---|
| 10 | — | — |
| 20 | SMAC = 11:22:33:44:55:66 & TCP Port 488 | 100, 101 |
| 30 | DMAC = aa:bb:cc:dd:ee:ff | 200, 220 |

In this exemplary Port ID-based waypoint policy, no action is specified for Port ID 10, while on Port ID 20 for each packet or frame having a source MAC address (SMAC) of 11:22:33:44:55:66 and a transmission control protocol (TCP) Port identifier of 488, the packet or frame is routed through a waypoint device having a WPVNID of 100 and waypoint device having a WPVNID of 101, in that order. Also, for Port ID 30, each packet or frame having a destination MAC address (DMAC) of aa:bb:cc:dd:ee:ff, the packet or frame is routed through a waypoint device having a WPVNID of 200 and a waypoint device having a WPV-NID of 220, in that order.

Table 2 shows an exemplary intra virtual network-based waypoint policy that may be implemented in a virtual network according to one embodiment.

TABLE 2

| VNID | Waypoint ID (WPVNID) |
|---|---|
| 15 | 300 |
| 25 | 400, 401 |
| 100 | 500, 550, 551 |

As shown in Table 2, in this exemplary intra virtual network-based waypoint policy, for each packet or frame specifying VNID 15, the packet or frame is routed through a waypoint device having a WPVNID of 300. Also, for each packet or frame specifying VNID 25, the packet or frame is routed through a waypoint device having a WPVNID of 400 and a waypoint device having a WPVNID of 401, in that order. Furthermore, for each packet or frame specifying VNID 100, the packet or frame is routed through a waypoint device having a WPVNID of 500, a waypoint device having a WPVNID of 550, and a waypoint device having a WPV-NID of 551, in that order.

Table 3 shows an exemplary inter virtual network-based waypoint policy that may be implemented in a virtual network according to one embodiment.

TABLE 3

| S-VNID | D-VNID | Waypoint ID (WPVNID) |
|---|---|---|
| 10 | 15 | 600 |
| 20 | 25 | 700, 701, 704 |

As shown in Table 3, in this exemplary inter virtual network-based waypoint policy, for each packet or frame specifying a source VNID (S-VNID) of 10 and a destination VNID (D-VNID) of 15, the packet or frame is routed through a waypoint device having a WPVNID of 600. Also, for each packet or frame specifying a S-VNID of 20 and a D-VNID of 25, the packet or frame is routed through a waypoint device having a WPVNID of 700, a waypoint device having a WPVNID of 701, and a waypoint device having a WPVNID of 704, in that order.

Of course, these are just examples of waypoint policies, and actual waypoint policies may be based on any combination of factors, characteristics, and/or values stored within and without packets and/or frames received transmitted in a virtual network.

Figure 4:
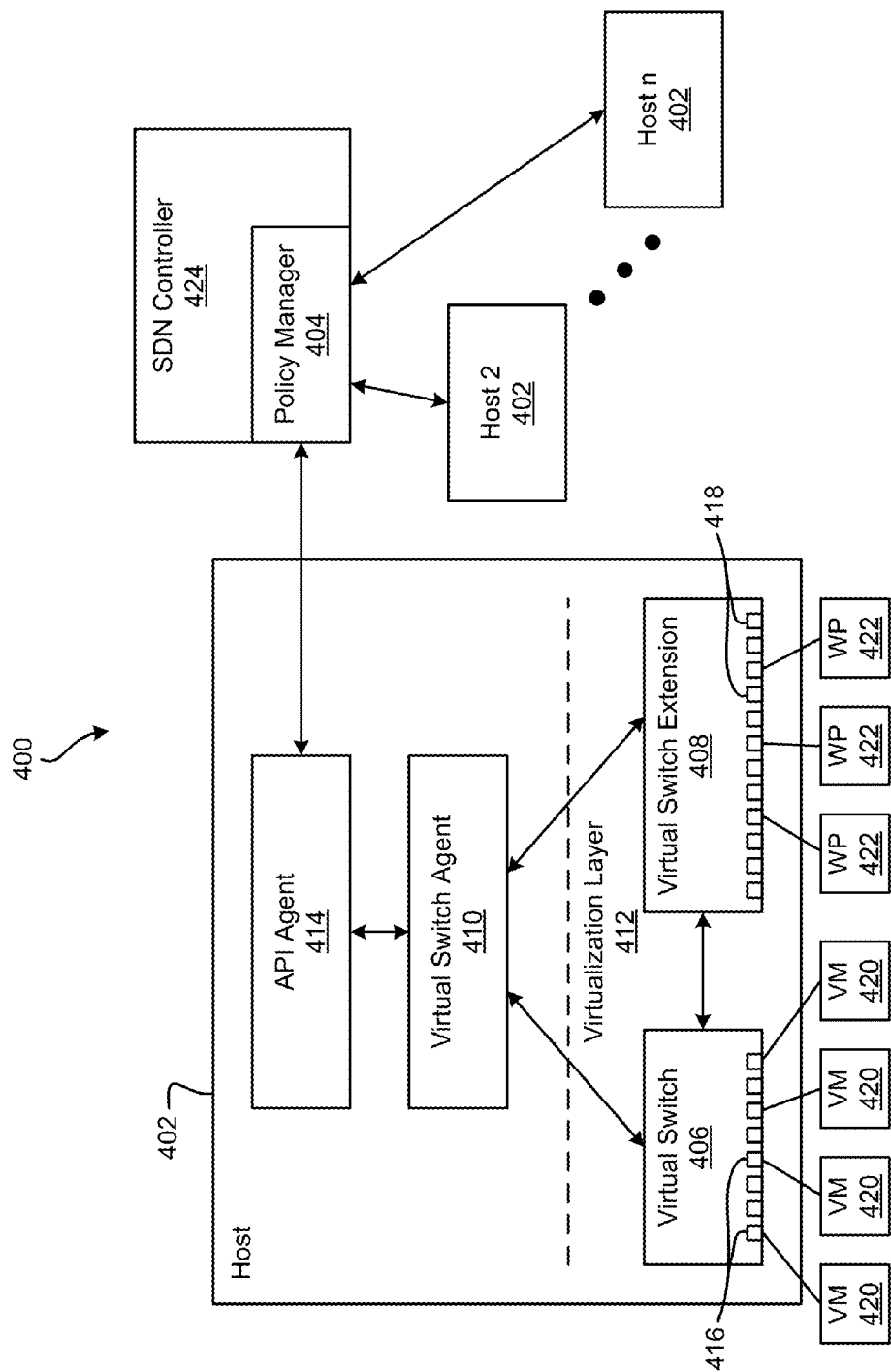
FIG. 4 is a simplified diagram of a system in accordance with one embodiment.

Now referring to FIG. 4, a system 400 is shown according to one embodiment. The system 400 includes a host 402 in communication with a waypoint or policy manager 404. The waypoint or policy manager 404 may be implemented in a SDN controller 424 or some other suitable controller configured to communicate with the host(s) 402, or may be a standalone device, module, processor, etc. More than one host 402 may be present in the system 400, according to various embodiments. The host 402 includes a virtual switch 406 (which may also include a virtual switch extension 408), along with a virtual switch agent 410 configured to communicate with the virtual switch 406 (and possibly the virtual switch extension 408), in order to handle packet ingress and egress through the virtual switch 406 (and possibly the virtual switch extension 408). The virtual switch 406 is configured to handle normal packet (packets which do not indicate handling by any WPVNIDs) ingress and egress along with packet ingress and egress from and to waypoint device(s) that are connected to the host 402. Should a virtual switch extension 408 be included in the virtual switch 406, it may be configured to handle packet ingress and egress from and to waypoint device(s) that are connected to the host 402, while the normal packet ingress and egress is handled by the virtual switch 406. Should no waypoint devices be connected to the host 402, then the virtual switch extension 408 will not be utilized and packet ingress and egress from and to waypoint device(s) that are connected to the host 402 will be handled by the virtual switch 406.

The virtual switch 406 may include a plurality of VM ports 416, each VM port 416 being capable of communicating with one VM 420 connected to the virtual switch 406. Also, the virtual switch 406 and/or the virtual switch extension 408 includes one or more waypoint ports 418, each waypoint port 418 configured to communicate with one waypoint device 422 connected to the waypoint port 418.

In one embodiment, when the virtualization layer 412 is a Hypervisor, the virtual switch 406 may be implemented as a 'vSwitch,' the virtual switch agent 410 may be implemented as a 'vswitch agent,' and/or the virtual switch extension 408 may be implemented as a 'vSwitch extension,' terms which are specific to Hypervisor.

The host 402 also includes an application programming interface (API) agent 414 which is independent of the virtualization layer 412. The API agent 414 is configured to interact and communicate with the policy manager 404, among other tasks and function known in the art.

Each VM port 416 on the virtual switch 406 is associated with a VNID, with VM ports 416 having the same VNID when they are within and/or on the same virtual network. Each waypoint device 422 service is within and/or on a unique VNID referred to as a WPVNID, with no other VM 420 and/or waypoint device 422 providing a different service being within and/or on that WPVNID. Put another way, there may be multiple waypoint devices 422 in a single VNID when each provides the exact same functionality. This may be implemented in high-availability waypoint device functionality.

Figure 5A:
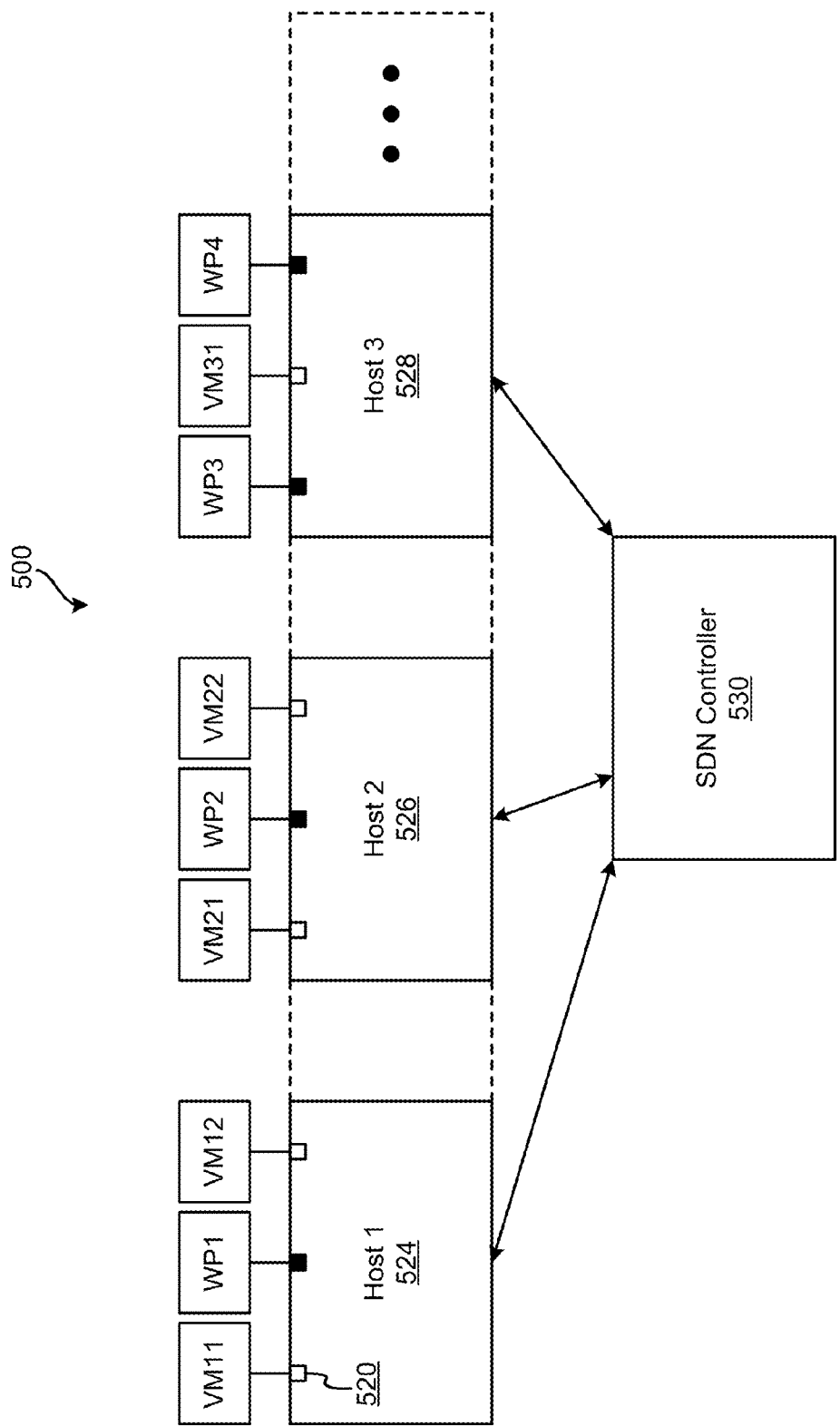
FIG. 5A is a block diagram of a distributed virtual switch system in accordance with one embodiment.

Now referring to FIG. 5A, a distributed virtual switch system 500 is shown to describe how policy information may be made available to each virtual switch on each of the hosts, e.g., first host 524, second host 526, third host 528, etc. The hosts are connected to a SDN controller 530 that is configured to communicate with each of the hosts to program packet forwarding decisions into each host, packet dropping policies for each host, and any other traffic flow policies, decisions, routing, pathing, etc., that is possible using a SDN controller of a type known in the art.

In order to share this policy information, each virtual switch is configured to create a tunnel between endpoint devices such that the traffic will pass-though desired waypoint device(s) (when configured to do so according to the waypoint policy).

When a packet or frame ingresses from a VM port 520, a policy/rule lookup is applied. This policy/rule may dictate that the packet or frame is routed through none, one, or multiple waypoint devices or appliances before being transmitted to its final destination endpoint device.

Figure 5B:
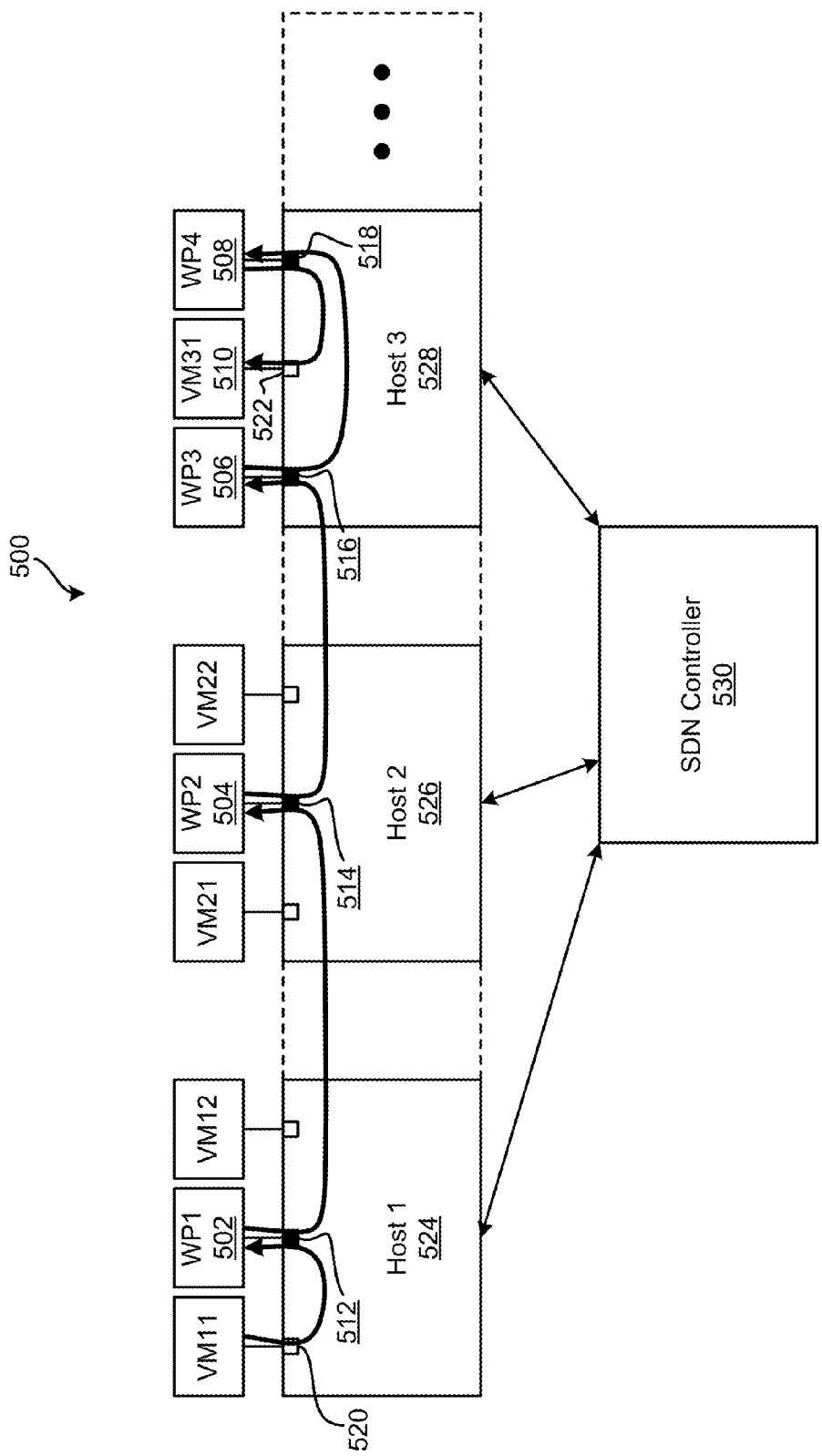
FIG. 5B is a block diagram of a distributed virtual switch system in which services are applied to packets in accordance with an exemplary embodiment.

In one example, as shown in FIG. 5B, the policy/rule dictates that the packet or frame is routed through waypoint devices 502, 504, 506, and 508 before being transmitted to an endpoint device 510. Therefore, the packet or frame is tunneled to the first waypoint device 502 according to the policy/rule, with a VNID in a header of the packet or frame being set to the WPVNID of the target (first) waypoint device 502. The packet or frame is then mapped to an egress port 512 based on the WPVNID specified in the packet. The packet or frame is egressed via the port 512 where the first waypoint device 502 is connected.

The packet or frame then is ingressed from the port 512 connected to the first waypoint device 502, and the policy/rule lookup is applied again to determine the next destination of the packet or frame. In this example, the next destination is the second waypoint device 504 in the second host 526. Therefore, the packet or frame is tunneled to the second waypoint device 504 according to the policy/rule, with a VNID in the header of the packet or frame being set to the WPVNID of the target (second) waypoint device 504. The packet or frame is then mapped to an egress port 514 based on the WPVNID specified in the packet. The packet or frame is egressed via the port 514 where the second waypoint device 504 is connected.

The packet or frame then is ingressed from the port 514 connected to the second waypoint device 504, and the policy/rule lookup is applied again to determine the next destination of the packet or frame. In this example, the next destination is the third waypoint device 506 in the third host 528. Therefore, the packet or frame is tunneled to the third waypoint device 506 according to the policy/rule, with a VNID in the header of the packet or frame being set to the WPVNID of the target (third) waypoint device 506. The packet or frame is then mapped to an egress port 516 based on the WPVNID specified in the packet. The packet or frame is egressed via the port 516 where the third waypoint device 506 is connected.

The packet or frame then is ingressed from the port 516 connected to the third waypoint device 506, and the policy/rule lookup is applied again to determine the next destination of the packet or frame. In this example, the next destination is the fourth waypoint device 508 that is also in the third host 528. Therefore, a VNID in the header of the packet or frame is set to the WPVNID of the target (fourth) waypoint device 508, the packet or frame is mapped to an egress port 518 based on the WPVNID specified in the packet, and the packet or frame is egressed via the port 518 where the fourth waypoint device 508 is connected. Then, after the packet or frame is ingressed from the port 518, a VNID in the header of the packet or frame is set to the EPVNID of the target endpoint device 510, the packet or frame is mapped to an egress port 522 based on the EPVNID specified in the packet or frame, and the packet or frame is egressed via the port 522 where the endpoint device 510 is connected.

Virtual service appliances in the network may be implemented in a number of different ways. One such way is a transparent implementation via L2, which is referred to as a bump in the wire and/or bridged. This type of virtual service appliance implementation is transparent to other VMs, and does not change the MAC and/or IP address of the packet's destination. Some examples of transparent virtual service appliances include a L2 firewall service appliance, an intrusion detection system (IDS), an intrusion protection system (IPS), etc.

A virtual service appliance may also be implemented as a routed-network address translation (NAT) implementation, which is explicitly addressed by VMs using a front-end IP address, terminate incoming connections, and initiate outgoing connections with a new source address. Some examples of routed-NAT virtual service appliances include a L4-L7 application delivery controller (ADC), a web proxy, etc.

Another virtual service appliance may be implemented as a routed-explicit gateway implementation, which is explicitly configured as a subnet gateway by VMs, performs L3 routing (changes source MAC address), and interfaces in each subnet that is being serviced. Some examples of routed-explicit gateway virtual service appliances include a L3 firewall, NAT, a web proxy, etc.

According to another implementation, a virtual service appliance may be implemented as a routed-implicit gateway implementation, which may be a subnet gateway for VMs, where cross-subnet traffic is transparently directed to the virtual service appliance, such that no per-VM subnet gateway configuration is required. Some examples of routed-implicit gateway virtual service appliances include a L3 firewall, NAT, a web proxy, etc.

According to one embodiment, a user may configure the waypoints in the virtual network such that desired services may be rendered to packets or frames therein. These virtual service appliances may be attached to a specific VNID and/or network. A WPVNID identifies the type of service provided by that waypoint, while multiple (similar functionality) waypoints may co-exist on the same VNID. One configuration for two waypoints providing the same service in a virtual network is where both service appliances are active, and traffic may be distributed (load balanced) between them. In another embodiment, the two waypoints providing the same service in a virtual network may have an active/standby relationship.

Figure 6:
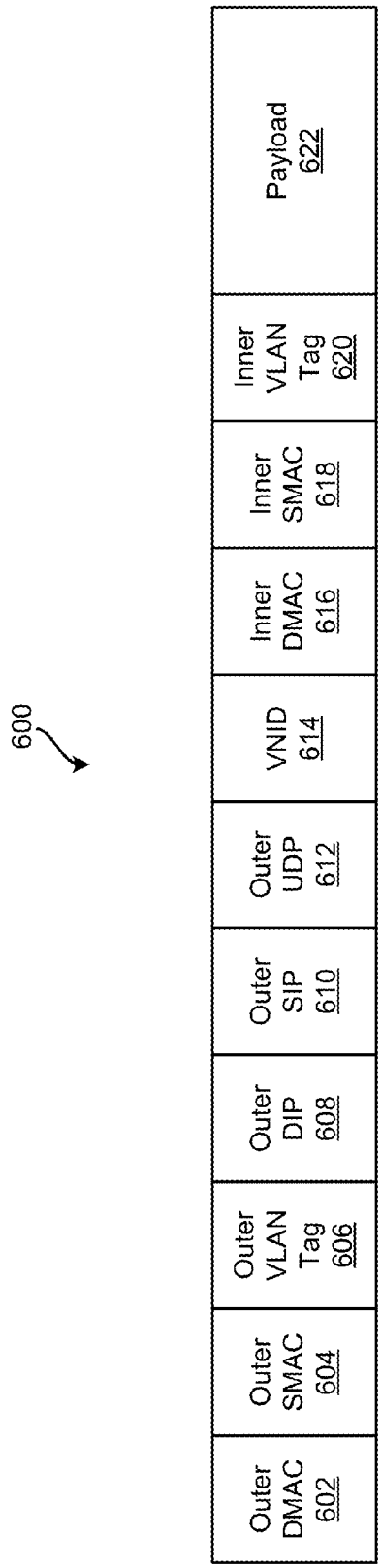
FIG. 6 is a diagram of a packet format according to one embodiment.

Now referring to FIG. 6, a packet format 600 is shown according to one embodiment. This packet format 600 may be used in a VXLAN implementation to encapsulate original packet(s) in order to tunnel the original packet(s) across the virtual network to have services applied thereto by the various virtual service appliances located in a virtual network. Of course, other packet headers than that shown in FIG. 6 may be used for this encapsulation which may adhere to other overlay technologies, such as NVGRE, LISP, OTV, etc., which may include additional fields, less fields, and/or different fields than those shown in the exemplary packet format 600, as would be understood by one of skill in the art.

The packet format 600 includes an outer destination MAC address (DMAC) field 602, an outer source MAC address (SMAC) field 604, an outer VLAN tag (such as a IEEE 802.1Q) field 606, an outer destination IP address (DIP) field 608, an outer source IP address (SIP) field 610, an outer user datagram protocol (UDP) field 612, a VNID field 614 (which may include a protocol specific ID, such as a VXLAN ID), an inner DMAC field 616, an inner SMAC field 618, an optional inner VLAN tag field 620, and a payload 622 (which typically includes one or more original packets).

The VNID field 614 may be used to store a WPVNID indicating the waypoint device (such as a virtual service appliance) to which the packet is to be directed, an EPVNID indicating the endpoint device to which the packet is to be directed to, and/or a standard VNID indicating the virtual network of the packet. In one embodiment, the VNID field 614 may be 24 bits in length, 12 bits in length, 32 bits in length, or some other suitable length as determined by an administrator and recognized by all devices in the virtual network.

In one embodiment, the outer DIP field 608, the VNID field 614, and the inner DMAC field 616 may be populated by a virtual switch based on information retrieved from a SDN controller. The outer DIP field 608 is configured to store the next/final hop, which is typically a virtual switch (such as an OpenFlow switch, DOVE switch, etc.). The inner DMAC field 616 is configured to store an intermediate or destination VM, appliance, or virtual appliance MAC address for the original packet in the payload 622.

In another embodiment, a query may be sent to a SDN controller or some other suitable controller by the virtual switch (or DOVE switch, OpenFlow switch, etc.) to retrieve other information. For example, the inner SMAC field 618 is an optional field that is configured to store an input to the SDN controller for flow path determination and/or modification. Also, an inner SIP field and an inner DIP field of the original packet in the payload 622 may also be configured to be inputs to the SDN controller for flow path determination and/or modification. The VNID associated with the originating VM or appliance may be determined by the query to the SDN controller or some other suitable controller by the virtual switch according to a further embodiment.

Therefore, according to one embodiment, there may be several interactions between the SDN controller and the one or more virtual and/or SDN-enabled switches in the virtual network. In another example, the one or more virtual and/or SDN-enabled switches may query the SDN controller for a location lookup, the query including a VNID along with a DIP and/or DMAC. The SDN controller may respond to this query with a next hop VNID, a next hop virtual or SDN-enabled switch, and/or a next hop DMAC (from an inner packet header). Furthermore, the one or more virtual and/or SDN-enabled switches may query the SDN controller for a policy lookup, the query including a VNID along with a DIP and/or DMAC and a SIP and/or SMAC. The SDN controller may respond to this query with a next hop VNID, a next hop virtual or SDN-enabled switch, and/or a next hop DMAC (from an inner packet header).

In order for these queries to be effective, the SDN controller may include and/or create the following mappings: VM to switch (given a VM, the virtual and/or SDN-enabled switch location is known), VM to host VNID, <MAC, VNID> to VM, <IP, VNID> to VM, VNID to [list of VMs in the VNID]. With these mappings, any query for information may be responded to with appropriate information allowing the packet to be transmitted to appropriate intermediate hops and the ultimate destination device.

In each virtual and/or SDN-enabled switch, these mappings may be included in a forwarding table, according to one embodiment. This forwarding table may be utilized to determine a destination address for a received packet which is to be forwarded on, and may be modified by the SDN controller to ensure that it is up-to-date.

Furthermore, in another example, the SDN controller may cause the virtual and/or SDN-enabled switches to flush the forwarding table stored therein, with a query for this purpose including a source VNID along with a list of MAC addresses or a list of destination VNIDs. A response to this query is an acknowledgement of completion of the flush. Flushing includes deleting and/or removing all or some of the entries in the forwarding table.

Figure 7:
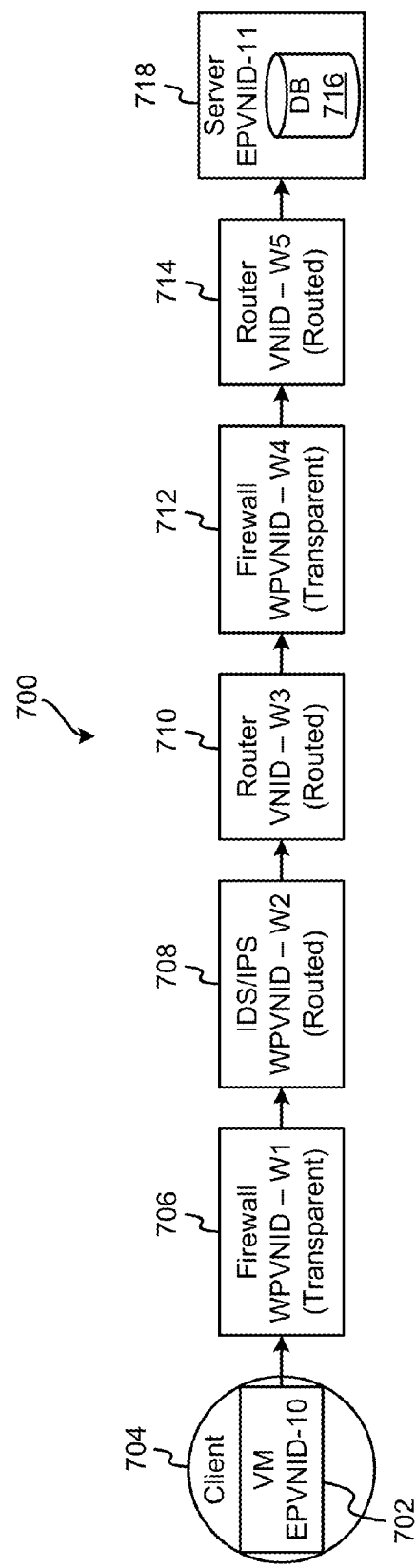
FIG. 7 is a block diagram of a service chain in accordance with one embodiment.

With reference to FIG. 7, a service chain 700 is shown according to one embodiment. In this service chain 700, a VM 702 (within EPVNID 10) on a client host 704 sends a query to reach a database (DB) 716 on a server 718 within EPVNID 11. The service chain, as devised the policy/rule implementation, includes a firewall 706 within WPVNID W1 (which acts as a transparent virtual service appliance), an IDS/IPS device 708 within WPVNID W2 (which acts as a routed virtual service appliance), a router 710 within VNID W3, a firewall 712 within WPVNID W4 (which acts as a transparent virtual service appliance), and a router 714 within VNID W5. Of course, any other virtual service appliances may be used in a service chain, in addition to, in place of, and/or instead of one or more of the virtual service appliances shown in the exemplary service chain 700 of FIG. 7.

Table 4 below shows the results of the various queries which are made along the service chain 700, in one example.

TABLE 4

| Querying VNID | (Source, Destination) VNID Pairs | Next Hop | Routed Hop |
|---|---|---|---|
| 10 | (10, 11), (10, W2) | W1 | W2 |
| W1 | (10, 11), (10, W2) | W2 | W2 |
| W2 | (10, 11), (10, W3) | W3 | W3 |
| W3 | (10, 11), (10, W5) | W4 | W5 |
| W4 | (10, 11), (10, W5) | W5 | W5 |
| W5 | (10, 11) | 11 | 11 |

The VNID may be derived from a <SIP, DIP> tuple in one embodiment.

Also, the querying VNID is the virtual and/or SDN-enabled switch making the policy lookup query, the (Source, Destination) VNID Pairs may be derived from the policy query, i.e., SIP, DIP, SMAC, DMAC, etc. The next hop indicates the next service in the chain, and the routed hop indicates the DMAC to be put in the inner packet header. When the routed hop is a WVNID (indicating that the routed hop is a waypoint device), then one of the VM ports (it does not matter which one) registered on that WVNID is returned as the inner DMAC address. When the routed hop is an EPVNID (indicating that the routed hop is an endpoint device), then the actual destination VM port is returned as the inner DMAC address.

Figure 8:
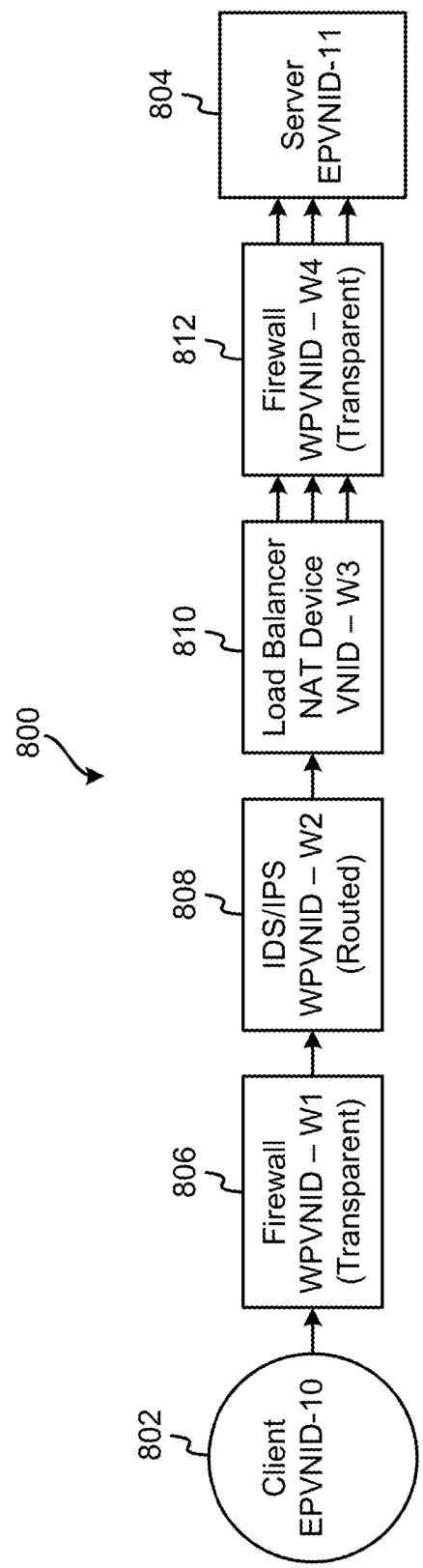
FIG. 8 is a block diagram of a service chain in accordance with another embodiment.

FIG. 8 shows a service chain 800 according to one embodiment. In this exemplary service chain 800, a client 802 and a server 804 are endpoint devices having EPVNIDs 10 and 11, respectively. The service chain 800 includes a firewall 806 (transparent) within WPVNID W1 and a firewall 812 (transparent) within WPVNID W4, an IPS/IDS device 808 (routed) within WPVNID W2, and a load balancer 810 within WPVNID W3. Of course, any other virtual service appliances may be used in a service chain, in addition to, in place of, and/or instead of one or more of the virtual service appliances shown in the exemplary service chain 800 of FIG. 8.

The load balancer 810 is configured to terminate connections coming in from the client 802 and create new connections to the server 804 (such as for access to the DB).

The service chain 800 is defined by an administrator, such as a user, the SDN controller, or some other entity capable of making such a determination. In this example, the service chain 800 is {W1→W2→W3→W4}. The policy/rule which implements this service chain may also be defined by an administrator, such as a user, the SDN controller, or some other entity capable of making such a determination. In this example, the policy is {10→11}={W1→W2→W3→W4}.

When the client 802 sends packets to an address in VNID W3, the SIP is set as VNID 10, and the DIP is set as VNID W3. However, when the VM (load balancer 810) in VNID W3 sends a packet to the server 804 in VNID 11, there are two ways of handling the egress: keep the SIP of VNID 10 and DIP of VNID 11, or set a new SIP of VNID W3 and DIP of VNID 11.

In order to resolve this ambiguity, one or more service chain tables may be maintained in the SDN controller or some other entity suitable for providing service chain information to the various components in the virtual network. Table 5 shows one such table according to one exemplary embodiment.

TABLE 5

| Querying VNID | (Source, Destination) VNID Pairs | Next Hop | Routed Hop |
|---|---|---|---|
| 10 | (10, W3) | W1 | W2 |
| W1 | (10, W3) | W2 | W2 |
| W2 | (10, W3) | W3 | W3 |
| W3 | (10, 11), (W3, 11) | W4 | W4 |
| W4 | (10, 11), (W3, 11) | 11 | 11 |

In one embodiment, the transition from EPVNID 10 to WPVNID W3 may be treated as one (S*, D*) combination for implementation in the service chain [W1,W2]. Furthermore, in another embodiment, the transition from EPVNID 10 to EPVNID 11 may be treated as several (S*, D*) combinations for implementation in the service chain [W4].

This results in the service chain table to be adjusted as it appears in Table 6, below.

TABLE 6

| Querying VNID | (Source, Destination) VNID Pairs | Next Hop | Routed Hop |
|---|---|---|---|
| 10 | (10, W3), (10, W2) | W1 | W2 |
| W1 | (10, W3), (10, W2) | W2 | W2 |
| W2 | (10, W3) | W3 | W3 |
| W3 | (10, 11), (10, W4) + (W3, 11), (W3, W4) | W4 | W4 |
| W4 | (10, 11), (W3, 11) | 11 | 11 |

The service chain tables may be used in the following context. An input and/or query is received from a SDN-enabled switch and/or a virtual switch that includes a query VNID for the service appliance/VM and a destination address (a DIP and/or DMAC), along with an optional SIP and/or SMAC (for flow path determination purposes).

The SDN controller or some other suitable entity derives the source VNID from the SIP (and/or SMAC), which may be accomplished via a lookup on a hash table which correlates such addresses to one another, such as via a single operation O(1). Then, the destination VNID is derived from the DIP (and/or DMAC), which may also be accomplished via a lookup on the hash table which correlates such addresses to one another, such as via a single operation O(1). Then the service chain table is consulted, such as via a query with the query VNID and the source and destination VNID in a tuple, e.g., Query VNID+(Source VNID, Destination VNID). This provides a result, which includes a next hop and a next routed hop, e.g., Answer=Next Hop+Next Routed Hop. The next hop determines the next virtual and/or SDN-enabled switch+VNID, while the next routed hop determines the inner MAC address. This lookup costs a total of O(1).

Figure 9:
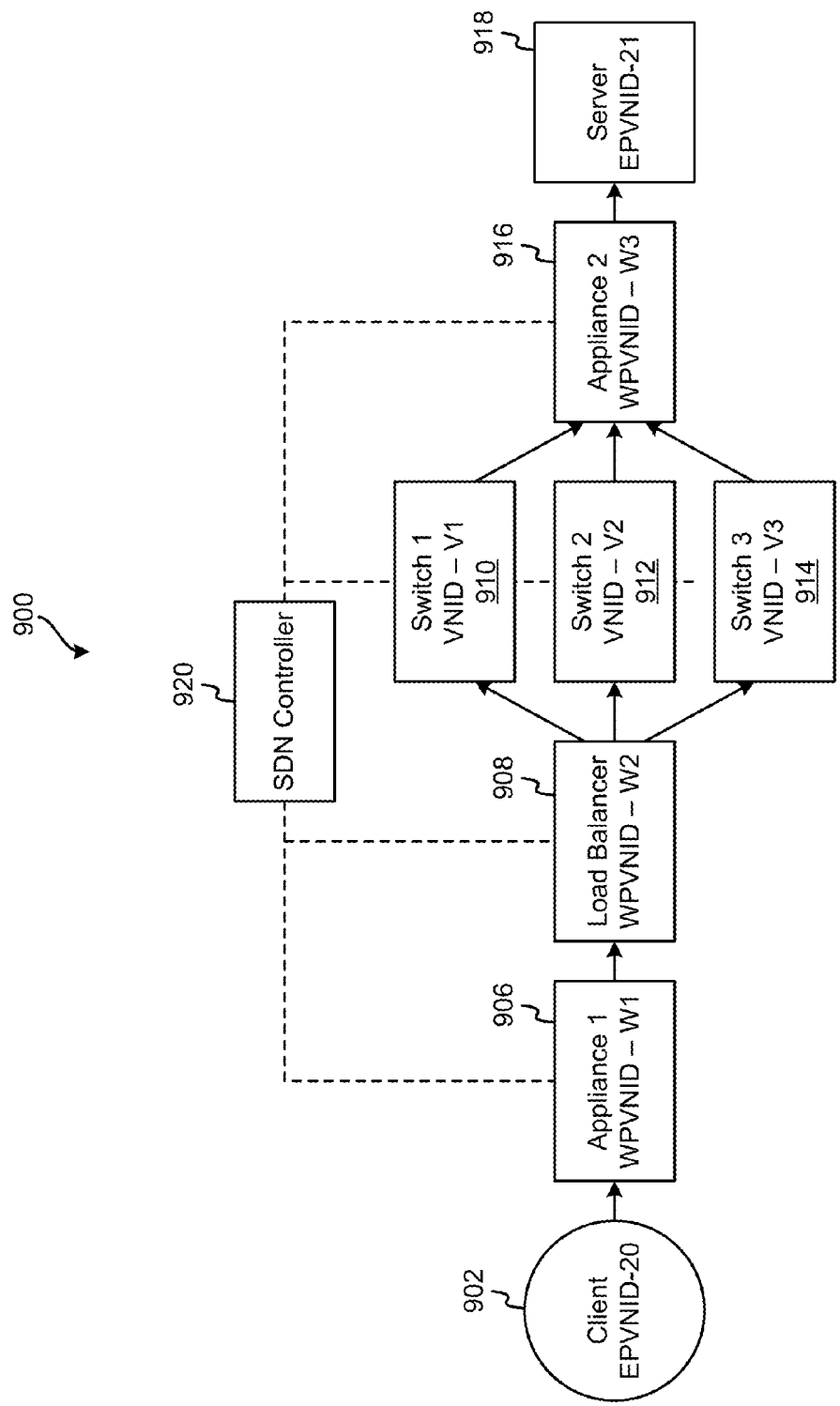
FIG. 9 is a block diagram of a service chain in accordance with yet another embodiment.

FIG. 9 shows a service chain 900 according to another embodiment. In this exemplary service chain 900, a client 902 and a server 918 are endpoint devices having EPVNIDs 20 and 21, respectively. The service chain 900 includes Appliance 1 906 (which may provide any service known in the art, such as firewall, IPS/IDS, etc., and may be transparent or routed) within WPVNID W1, a load balancer 908 within WPVNID W3, three (or more) switches: Switch 1 910 (within VNID V1), Switch 2 912 (within VNID V2), and Switch 3 914 (within VNID V3), and Appliance 2 916 (which may provide any service known in the art, such as firewall, IPS/IDS, etc., and may be transparent or routed) within WPVNID W3. Of course, any other virtual service appliances may be used in a service chain, in addition to, in place of, and/or instead of one or more of the virtual service appliances shown in the exemplary service chain 900 of FIG. 9.

The load balancer 908 is configured to terminate connections coming in from the client 902 and create new connections to the server 918 (such as for access to the DB). In addition, the load balancer 908 is configured to request from the SDN controller 920 a next hop for any traffic flow being forwarded by the load balancer 908. A query is sent from the load balancer 908 to the SDN controller 920 which may include any relevant information that may be used by the SDN controller 920 to determine a next hop in the network. In one embodiment, the query may include a cookie that includes information regarding a next hop device remembered by the load balancer 908 for the particular traffic flow to be forwarded. The cookie may be of a type known in the art. For example, a cookie may be data (about 4 kB in size, or more, or less) that indicates a user or system, an authentication of a user or system, prior activity of a user or system, or any other pertinent information, such as a remembered next hop device, that may be stored and resent to a requesting entity, such as the SDN controller 920. The next hop may be determined by the SDN controller 920 according to one or more algorithms. In a further embodiment, the query may include an indication of the traffic flow, thereby allowing the SDN controller 920 to determine what the next hop device is for the traffic flow based at least in part on one or more characteristics of the traffic flow. Any characteristic of the traffic flow may be used to make this determination, such as an inner frame MAC address of a packet in the traffic flow, TCP/UDP port information included in a packet of the traffic flow, latency of the traffic flow (desired and/or realized latency), etc.

The indication of the traffic flow may include, but is not limited to, a unique ID of a next service element in the service chain, a MAC address of a next hop device in the network, etc. In FIG. 9, for the load balancer 908, the unique ID would be for a next hop, which is one of the switches: Switch 1 910, Switch 2 912, or Switch 3 914.

When a next hop for a particular traffic flow has not previously been established, then the load balancer 908 is configured to send the query without any cookie contained therein or with an invalid cookie, which indicates that no preconfigured next hop has been established. An invalid cookie may be designated as all zeros, all ones, or some other predetermined character string. When a next hop for a particular traffic flow has previously been established, then the load balancer 908 is configured to send the query with a cookie (that is retrieved from a forwarding cache of the load balancer 908) that was previously received in a message from the SDN controller 920 which indicates the next hop. The cookie may be stored in some other area or storage medium of the load balancer 908 as would be understood by one of skill in the art upon reading the present descriptions.

According to a further embodiment, the SDN controller 920 is configured to receive the query from the load balancer 908 and respond with a message which includes the next hop for the traffic flow indicated in the query, including a cookie which identifies the next hop. The SDN controller 920 is also configured to read the query to determine whether a cookie is included therein. When a cookie is included, the SDN controller 920 is configured to determine whether the cookie is legitimate. By legitimate, what is meant is that a device indicated as a next hop by the cookie is functional, online, operating normally, and/or capable of handling the traffic flow.

In one embodiment, it does not matter whether the SDN controller 920 would have determined the next hop as identified in the cookie based on all available next hop devices, as long as the next hop device is still legitimate. In a situation where another device comes online and would be a better choice for load balancing purposes, this device is not identified as the next hop in the message when the query includes a cookie identifying a different original device which is still legitimate. Instead, the next hop device is identified as being the same as the next hop device identified in the cookie received from the load balancer 908.

For a query which includes an invalid cookie or a cookie of a next hop device which is no longer legitimate, the load balancer 908 performs calculations to determine which is an appropriate next hop for the particular traffic flow, and sends the message to the load balancer 908 with a cookie identifying this next hop. The load balancer 908 then stores this cookie (such as in a forwarding cache) for use when the particular traffic flow is received/encountered again.

The message may also include any relevant information that will aid the load balancer 908 in making the same next hop device determination each time, such as an indication of the traffic flow, which may include, but is not limited to, a unique ID of a next service element in the service chain, an inner MAC frame of a packet type, TCP/UDP port information for a particular packet in the traffic flow, and a latency of the traffic flow (desired and/or realized latency).

The SDN controller 920 is also configured to instruct any device to delete a cookie related to a next hop device which has been determined to no longer be legitimate, e.g., the device has malfunctioned, lost power, and/or been removed from the SDN. In this way, the device will no longer be considered as an option for forwarding traffic, and a valid cookie will not be sent from any of the devices in the SDN in the query for a next hop.

Although in FIG. 9 a load balancer 908 is shown that sends and receives the cookie, any device that is in communication with the SDN controller 920 may utilize the same functionality of requesting from the SDN controller 920 a next hop (with or without a cookie) and receiving a message from the SDN controller 920 identifying the next hop (with a cookie), with the cookie being stored for future use when the particular traffic flow is encountered again.

This exchange of cookies is intended to lock a particular traffic flow to a particular device in a service chain or through a SDN, so that the particular traffic flow is always handled by the same device (when a plurality of devices are available to handle the traffic). This enables other types of network control to be utilized, based on which device is forwarding the traffic and allows devices to not have to relearn forwarding decisions every time traffic is rerouted through a different possible device.

The service chain 900 may be defined by an administrator, the SDN controller 920, or some other entity capable of making such a determination. In this example, the service chain 900 is {W1→W2→(V1,V2,V3)→W3}. The policy/rule which implements this service chain may also be defined by an administrator, the SDN controller 920, or some other entity capable of making such a determination. In this example, the policy is {20→21}={W1→W2→(V1,V2,V3)→W3}, with the load balancer 908 choosing which of the switches to send the traffic flow through.

Figure 10:
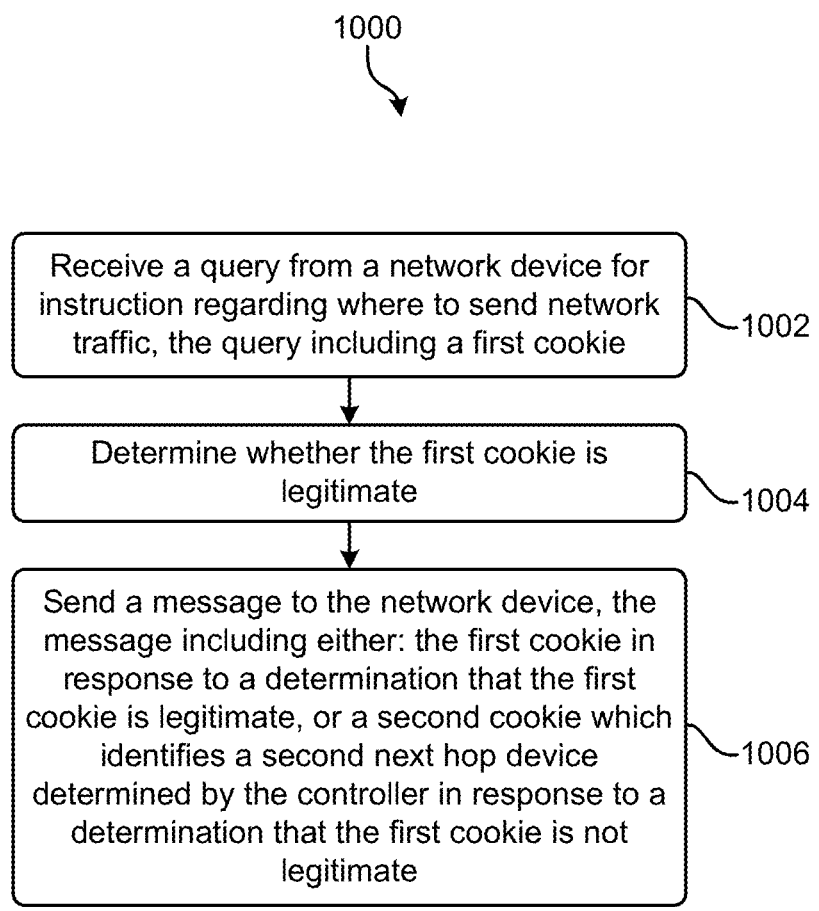
FIG. 10 is a flowchart of a method, according to one embodiment.

Now referring to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a mainframe, a server, a storage controller, an operating system of a storage system, or some other device having one or more processors and logic integrated with and/or executable by the processors. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a CPU, an ASIC, a FPGA, etc., combinations thereof, or any other suitable computing device known in the art.

As shown in FIG. 10, method 1000 may initiate with operation 1002, where a query is received from a device, the query requesting instruction regarding where to send network traffic. The query includes a first cookie.

In one embodiment, the first cookie may include identification of a first next hop device, such as a unique ID of the first next hop device, which is where the network device will send the network traffic that matches a certain characteristic.

The controller may be a policy manager, a waypoint manager, a SDN controller (such as an OpenFow controller, DOVE controller, etc.), or some other controller of a type known in the art that is suitable for handling such requests.

In operation 1004, the controller determines whether the first cookie is legitimate. The controller may perform any suitable algorithm, process, and/or calculation to determine whether the first cookie is legitimate.

In one embodiment, the first cookie may be determined to be legitimate as a result of a first next hop device identified by the first cookie operating normally and being capable of handling the network traffic. In this way, when a first hop device which is already programmed to be used to forward traffic to in the network device, it will not be changed by the controller so that the forwarding decision is not changed each time new network traffic destined for the first next hop device is received by the network device. Instead, the cookie allows the forwarding decision to be locked until it must be changed due to the first next hop device no longer being able to handle the network traffic efficiently.

Alternatively, the first cookie may be determined to not be legitimate as a result of at least one of: a next hop device identified by the first cookie not operating normally, the next hop device not being capable of handling the network traffic, and the first cookie not being valid. By not valid, what is meant is that the first cookie does not identify a next hop device at all, e.g., the cookie is set to all zeros or some other predetermined value indicating it is a default value.

In operation 1006, a message is sent from the controller to the network device in response to the query. The message may include either of the following: the first cookie in response to a determination that the first cookie is legitimate, or a second cookie which indicates a second next hop device determined by the controller in response to a determination that the first cookie is not legitimate.

In one embodiment, the controller may determine the second next hop device based on one or more characteristics of the network traffic.

Method 1000 may further include determining the second next hop device, using the controller, according to an algorithm configured to balance loads on all available next hop devices. In this way, when the network device has a choice of many devices with which to direct the network traffic, the controller balances loads across all of these devices in order to move network traffic through the network more efficiently, while still ensuring that any desired services are applied to the network traffic in a service chain.

Also, the method 1000 may include instructing the device to delete a cookie which has been determined to not be legitimate, the cookie identifying a next hop device. The cookie may no longer be legitimate due to the related next hop device being removed from the network, taken offline, malfunctioning, losing power, being repurposed for some other function in a service chain, etc. The cookie may be deleted from a forwarding cache of the device, in one embodiment.

In one embodiment, the controller may be a SDN controller and the method may be implemented on a device configured to communicate with the SDN controller via a common protocol, such as a virtual switch in a host, a SDN-enabled switch, a DOVE switch, a service chain waypoint, etc.

Figure 11:
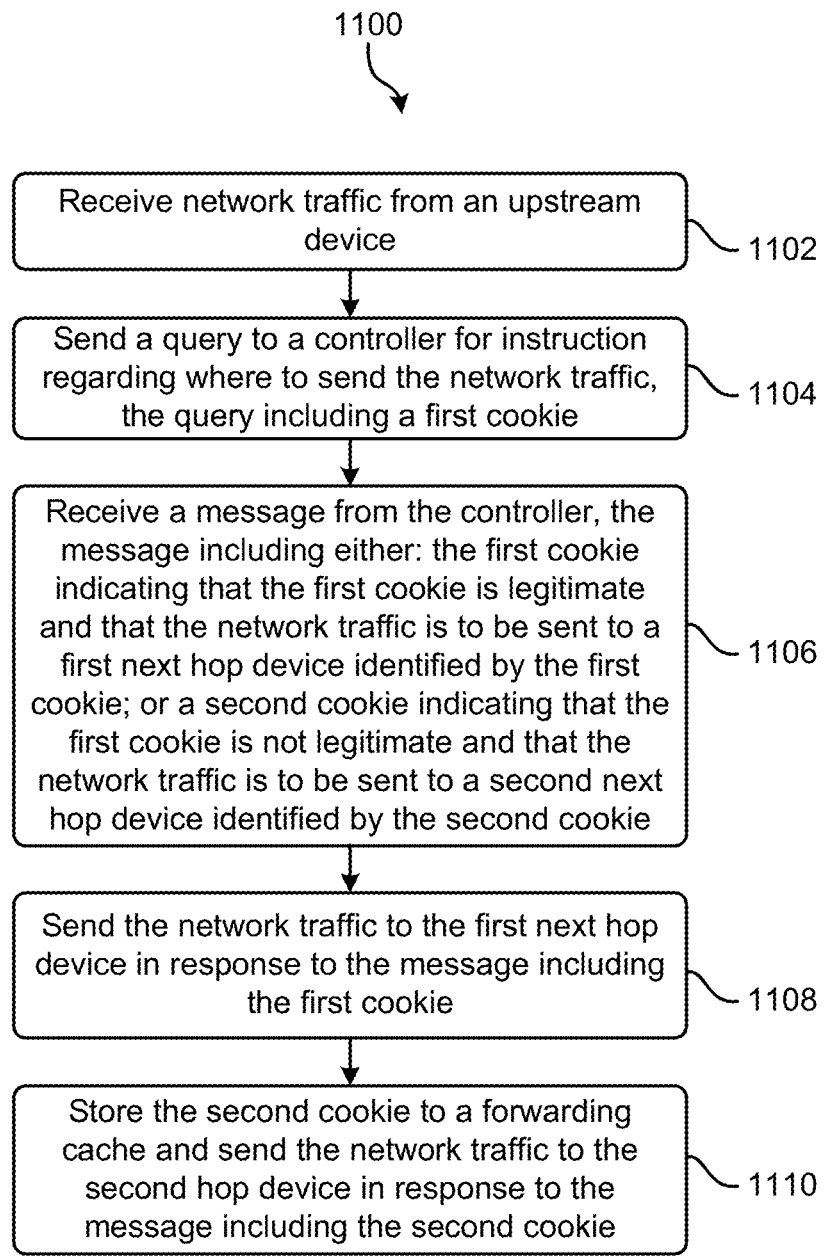
FIG. 11 is a flowchart of a method, according to another embodiment.

Now referring to FIG. 11, a flowchart of a method 1100 is shown according to one embodiment. The method 1100 may be performed in accordance with the present invention in any of the environments depicted in FIGS. 1-9, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a switch, a waypoint in a service chain, a mainframe, a server, a virtual switch on a server, a storage controller, an operating system of a storage system, or some other device having one or more processors and logic integrated with and/or executable by the processors. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a CPU, an ASIC, a FPGA, etc., combinations thereof, or any other suitable computing device known in the art.

As shown in FIG. 11, method 1100 may initiate with operation 1102, where network traffic is received from an upstream device. What is meant by upstream device is any device that is configured to forward and/or send network traffic to the network device which receives the network traffic, such as a switch, router, server, waypoint device in a service chain, VM, etc. The network traffic may include any number of packets, which may be packets destined for an overlay network, an underlay network, an Ethernet network, a storage network, etc.

In operation 1104, a query is sent to a controller for instruction regarding where to send the network traffic. The query includes a first cookie which may identify a first next hop device in one embodiment, or may be defaulted to some value (such as all zeros) which indicates no preprogrammed next hop device.

In one embodiment, the controller may be a SDN controller and the method may be implemented on a device configured to communicate with the SDN controller via a common protocol, such as a virtual switch in a host, a SDN-enabled switch, a DOVE switch, a service chain waypoint, etc.

The query, in one embodiment, may include information regarding the first next hop device, such as a unique ID, an address (MAC, IP, etc.), a name, a type, a location, etc.

In one embodiment, method 1100 may further include retrieving the first cookie from a forwarding cache of the network device in response to a determination that the first cookie is associated with the network traffic. In order to make this determination, one or more characteristics of the network traffic may be used, such as one or more of: an inner frame MAC address of a packet in the network traffic, transmission control protocol/user datagram protocol (TCP/UDP) port information included in a packet of the network traffic, a desired latency of the network traffic, and/or a realized latency of the network traffic. The desired latency is a latency that is indicated in a header or some other portion of one or more packets of the network traffic, such as by using a priority indicator. A realized latency is a latency that one or more packets in the network traffic have actually experienced during transit through the network. This may be used to determine whether the network traffic should be given a higher priority in order to arrive at a destination according to the desired latency, or may be forwarded in a slower fashion when the desired latency is not in jeopardy.

In operation 1106, a message is received from the controller. The message includes either: the first cookie indicating that the first cookie is legitimate and that the network traffic is to be sent to a first next hop device identified by the first cookie, or a second cookie indicating that the first cookie is not legitimate and that the network traffic is to be sent to a second next hop device identified by the second cookie.

In operation 1108, the network traffic is sent to the first next hop device in response to the message including the first cookie. This enables the network device to maintain the same next hop device to send network traffic to regardless of any other network changes or alternate downstream devices which may be able to process the network traffic, so that a relationship between the network device and the next hop device is maintained.

In operation 1110, the second cookie is stored to a forwarding cache and the network traffic is sent to the second hop device in response to the message including the second cookie. In this way, when the first next hop device is not able to handle the network traffic, a different next hop device is selected for receiving the network traffic.

In another embodiment, method 1100 may include receiving instruction from the controller to delete a cookie related to a next hop device which has been determined to not be legitimate by the controller. Method 1100 may also include deleting the stored cookie related to the next hop device in response to the instruction. The instruction may be received from the controller, with the cookie having been previously received from the controller and associated with a certain traffic flow having some designated characteristics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

Some of the advantages of the systems and methods described herein include not needing to alter or further encapsulate packets in order to transport them via a virtual service appliance. Also, a service appliance is able to be added and/or inserted into an overlay network without any changes needing to be made to the service appliance, as the service appliance is not required to participate in control plane activities other than declaring what category of appliance it is prior to deployment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A controller comprising:
a hardware processor; and
logic integrated with and/or executable by the hardware processor, the logic being configured to cause the hardware processor to:
receive a query from a network device for instruction regarding where to send network traffic, the query including a first cookie;
determine whether the first cookie is legitimate; and
send a message to the network device, the message including either:
the first cookie in response to a determination that the first cookie is legitimate; or
a second cookie which identifies a second next hop device determined by the controller in response to a determination that the first cookie is not legitimate.

2. The controller as recited in claim 1, wherein the logic configured to cause the hardware processor to determine whether the first cookie is legitimate is further configured to cause the hardware processor to determine that the first cookie is legitimate as a result of a first next hop device identified by the first cookie operating normally and being capable of handling the network traffic.

3. The controller as recited in claim 1, wherein the logic configured to cause the hardware processor to determine whether the first cookie is legitimate is further configured to cause the hardware processor to determine that the first cookie is not legitimate as a result of at least one of: a next hop device identified by the first cookie not operating normally, the next hop device not being capable of handling the network traffic, and the first cookie not being valid.

4. The controller as recited in claim 3, wherein the first cookie is not valid as a result of the first cookie not identifying a next hop device.

5. The controller as recited in claim 1, wherein the logic is further configured to cause the hardware processor to determine the second next hop device according to an algorithm configured to balance loads on all next hop devices available to the network device.

6. The controller as recited in claim 1, wherein the logic is further configured to cause the hardware processor to instruct the network device to delete the first cookie in response to a determination that the first cookie is not legitimate.

7. The controller as recited in claim 6, wherein the first cookie is not legitimate as a result of the next hop device malfunctioning, losing power, or being removed from the network.

8. A network device comprising:
a hardware processor; and
logic integrated with and/or executable by the hardware processor, the logic being configured to cause the hardware processor to:
receive network traffic from an upstream device;
send a query to a controller for instruction regarding where to send the network traffic, the query including a first cookie;
receive a message from the controller, the message including either:
the first cookie indicating that the first cookie is legitimate and that the network traffic is to be sent to a first next hop device identified by the first cookie; or
a second cookie indicating that the first cookie is not legitimate and that the network traffic is to be sent to a second next hop device identified by the second cookie;
send the network traffic to the first next hop device in response to the message including the first cookie; and
store the second cookie to a forwarding cache and send the network traffic to the second hop device in response to the message including the second cookie.

9. The network device as recited in claim 8, wherein the logic is further configured to cause the hardware processor to retrieve the first cookie from the forwarding cache in response to a determination that the first cookie is associated with the network traffic, wherein one or more characteristics of the network traffic are used to make the determination.

10. The network device as recited in claim 9, wherein the characteristics include one or more of: an inner frame media access control (MAC) address of a packet in the network traffic, transmission control protocol/user datagram protocol (TCP/UDP) port information included in a packet of the network traffic, a desired latency of the network traffic, and a realized latency of the network traffic.

11. The network device as recited in claim 10, wherein the first cookie identifies the first next hop device.

12. The network device as recited in claim 8, wherein the logic is further configured to cause the hardware processor to:
receive instruction from the controller to delete a cookie, the cookie being related to a next hop device; and
delete the cookie related to the next hop device in response to the instruction.

13. A computer program product comprising a computer readable storage medium having program instructions embodied therewith, the embodied program instructions executable by a processor to cause the processor to perform a method comprising:
receiving network traffic, using a network device, from an upstream device;
sending a query from the network device to a controller for instruction regarding where to send network traffic, the query including a first cookie;
determining, using the controller, whether the first cookie is legitimate; and
sending, using the controller, a message to the network device, the message including either:
the first cookie which identifies a first next hop device in response to a determination that the first cookie is legitimate; or
a second cookie which identifies a second next hop device determined by the controller in response to a determination that the first cookie is not legitimate;
sending the network traffic to the first next hop device identified by the first cookie in response to the message including the first cookie; and
storing the second cookie to a forwarding cache of the network device and sending the network traffic to the second hop device in response to the message including the second cookie.

14. The computer program product as recited in claim 13, wherein the method further includes determining, using the controller, that the first cookie is legitimate as a result of the first next hop device identified by the first cookie operating normally and being capable of handling the network traffic.

15. The computer program product as recited in claim 13, wherein the method further includes determining, using the controller, that the first cookie is not legitimate as a result of at least one of: the first next hop device identified by the first cookie not operating normally, the first next hop device not being capable of handling the network traffic, and the first cookie not being valid.

16. The computer program product as recited in claim 15, wherein the first cookie is determined to be valid as a result of the first cookie identifying any next hop device.

17. The computer program product as recited in claim 13, wherein the method further comprises:
instructing, using the controller, the network device to delete a cookie determined to not be legitimate, the cookie identifying a next hop device; and
deleting, using the network device, the cookie identifying the next hop device in response to the instructions.

18. The computer program product as recited in claim 13, wherein the method further comprises determining that the first cookie is not legitimate as a result of the first next hop device malfunctioning, losing power, or being removed from the network.

* * * * *